Figure 1:
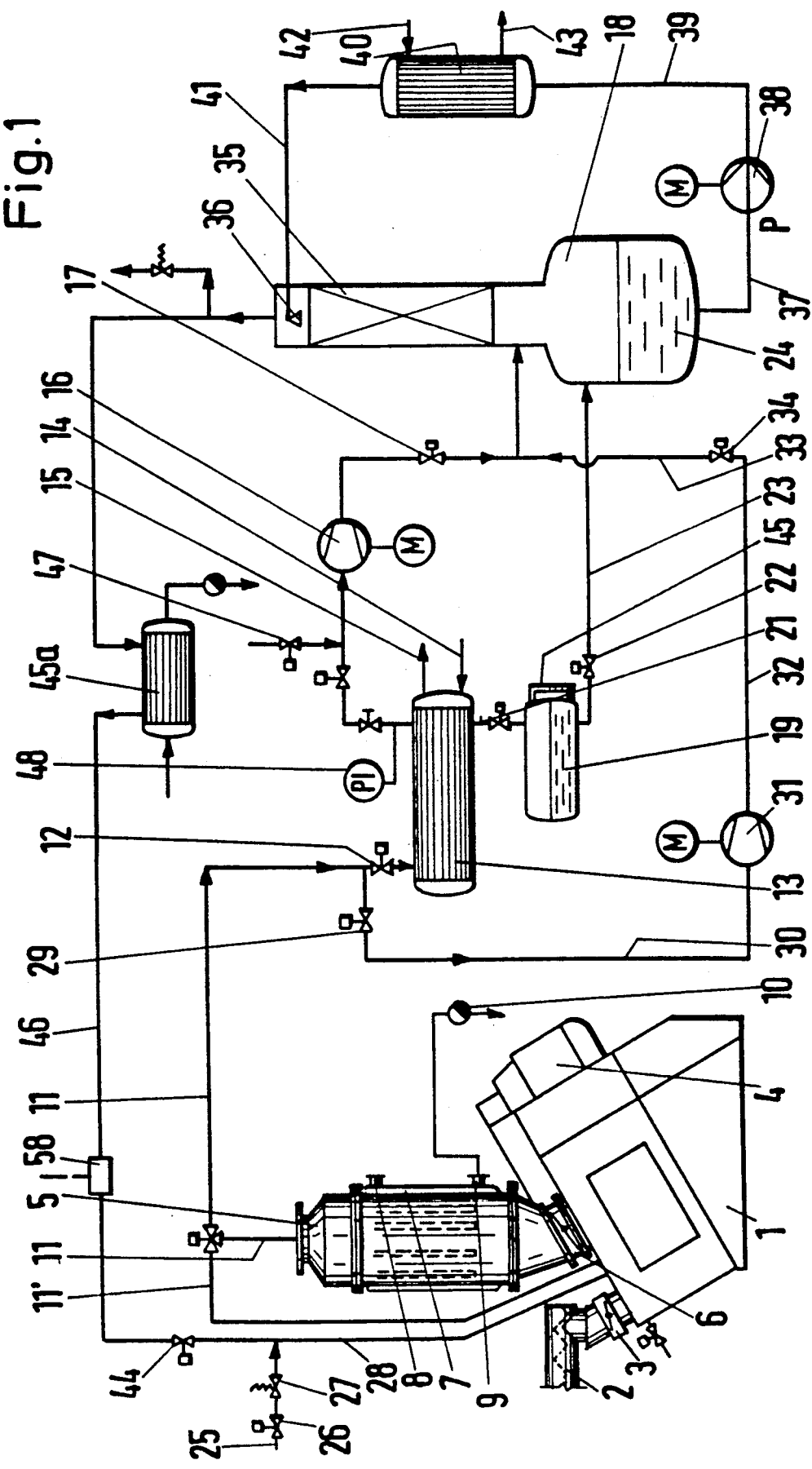

United States Patent [19]

Dürr

[11] Patent Number: 5,016,361
[45] Date of Patent: May 21, 1991

[54] METHOD OF EXTRACTING LIQUID FROM WET MATERIAL

[75] Inventor: Herbert Dürr, Buchen, Fed. Rep. of Germany

[73] Assignee: Maschinenfabrik Gustav Eirich, Hardheim, Fed. Rep. of Germany

[21] Appl. No.: 304,780

[22] Filed: Jan. 31, 1989

[30] Foreign Application Priority Data

Feb. 3, 1988 [DE] Fed. Rep. of Germany ....... 3803109

[51] Int. Cl.$^5$ .............................................. F26B 3/08
[52] U.S. Cl. ........................................ 34/10; 34/57 R
[58] Field of Search ............. 432/15, 58; 34/10, 57 A, 34/57 R, 57 B, 17

[56] References Cited

U.S. PATENT DOCUMENTS 3,439,899 4/1969 Hershler ................................. 34/10
3,597,850 8/1971 Jenkins ................................... 34/10

FOREIGN PATENT DOCUMENTS 981785 12/1982 U.S.S.R. .................................. 34/10

Primary Examiner—Henry A. Bennett
Attorney, Agent, or Firm—Howard M. Ellis; Michael L. Dunn

[57] ABSTRACT

A method of extracting liquid from wet material in a fluidized bed is characterized in that in a circulating fluidized bed created mechanically by a mixing means, the material is thoroughly mixed, essentially in its entirety and in that in a first stage of the method, using the heat potential of the wet material, the liquid contained at below atmospheric pressure is at least partially evaporated and in that in a second stage of the method which follows on immediately from the first, heated gas is passed through the fluidized bed, the drying process being completed by at least partial saturation of the gas with the vapor from the liquid which is to be extracted.

18 Claims, 5 Drawing Sheets

METHOD OF EXTRACTING LIQUID FROM WET MATERIAL

Methods of drying wet material are known and are already being used in practice.

For example, a method is known for drying wet bulk material, e.g. brake lining compositions, in which the bulk material is mechanically prepared and damaged in a mixing machine. Following the mechanical preparation, the wet bulk material is emptied, divided into portions and spread on trays. These trays are placed in a cabinet and stacked one above another with a space between them. Then warm air is passed through the interior of the closed cabinet and the bulk material is dried. This method has the disadvantage that the bulk material has to be taken from the mixing machine, spread over the trays and introduced into the drying cabinet generally by hand. Furthermore, it is a time and energy consuming process. Furthermore, this drying process produces a product which to a certain extent sticks together so that in the example of the brake lining compositions, the moulds cannot be easily filled.

Drying methods are also known in which the wet bulk material is fed to so-called fluidised bed dryers. This is an apparatus in which the dry air is introduced through a perforated floor or such like and flows through the material to be mixed, from below. Also this process has one vital disadvantage in that the air velocity required on the one hand is variable due to the varying density of the material in consequence of the drying process and in that, on the other hand, the agglomerated materials to be mixed or such like are at the outset present in various sizes. Fluidised bed dryers can only enjoy optimum operation if the granulation of the material is as regular as possible, so that the flow velocity of the drying air can be so adjusted that the material to be dried is just kept in suspension. With a heterogeneous size distribution of the material to be mixed, this optimum air velocity cannot be adjusted. This means that lighter parts are entrained with the air flow while heavier parts will largely escape the drying process because they cannot be moved into a suspended state.

Drying methods have also become known already in which the material to be mixed is left in the mixing container. Generally these are mixing apparatuses which have a horizontally disposed stationary mixing container and a mixing spindle contained therein and revolving about a horizontal axis.

After the addition of the mixing components which consist for example of filters, fibre-like constituents and liquid binders, the mixing process is set in motion and when it is concluded the composition is dried. For drying of the wet bulk goods, the mixing container which has a double jacket, is heated and the interior of the mixer is exposed to a vacuum. By virtue of the vacuum, evaporation of the liquid components commences, the vapour can be extracted and precipitated in a condenser. As the degree of dryness increases, the evaporating effect diminishes because a boundary layer which builds up between the mixing mechanism and the container wall substantially impairs the heat transmission so that it is no longer possible to feed to the material to be mixed the evaporation energy needed for evaporation. In addition, the fact that the product becomes dry means that the contacting heat exchange surface between product particles and container walls becomes smaller. This, too, prevents heat transfer. In practice, it was found that vacuum drying in mixing machines starts relatively spontaneously and violently but then, by virtue of the problems illustrated, it rapidly settles down or becomes so drawn out in time that also this method often cannot be applied on economic grounds.

Drying methods are also known which follow directly on from a mixing process, entailing working with what is referred to as through-venting drying. Here the use of vacuum is intentionally avoided and instead one works with a so-called through-venting drying process. For this purpose, drying air is introduced through a number of jets into the lower half of the mixing container, for example with horizontal drum mixers. The air flows through the material to be mixed and becomes to a certain extent saturated with the vapour of the liquid contained. This type of aeration drying is to a certain extent related to tray drying although here one can see the advantage that the material to be mixed is moved by the mixing tools so that the drying process can be accelerated in comparison with tray drying. However, this process does have the disadvantage that relatively large quantities of air or gases are required in order to dissipate the moisture. The use of large quantities of gas does however involve problems with the deposition of fine material from the flow of gas. In practice, this means that one has to yield to relatively long drying times in order to keep the gas velocities within technically tolerable limits.

The invention is based on the problem of providing a method which eliminates the above disadvantages and which permits of the shortest possible drying times with the least consumption of energy.

The method according to the invention, for the extraction of liquid from wet material in a fluidised bed is characterised in that in a circulating fluidised bed created mechanically by a mixing means, the material is thoroughly mixed, essentially in its entirety and in that in a first stage of the method, using the heat potential of the wet material, the liquid contained at below atmospheric pressure is at least partially evaporated and in that in a second stage of the method which follows on immediately from the first, heated gas is passed through the fluidised bed, the drying process being completed by at least partial saturation of the gas with the vapour from the liquid which is to be extracted.

In the case of the method mentioned here, the decisive advantage resides in the fact that in the rotating circulating fluidised bed, the process of evaporation of the fluid at a correspondingly reduced pressure can start spontaneously, initially with no supply of energy from outside, i.e. while avoiding all the above-described disadvantages of heat transfer through a wall, because each particle already contains the energy needed for evaporation and because the said fluidised bed guarantees free emergence of the vapour. As soon as the energy content for further evaporation of fluid has been substantially consumed, no attempt is made to add additional energy by for instance heating the jacket of the mixing container, but instead the vacuum drying process is broken off and without any interruption there is a switch-over to the through-venting drying process. For this, dry heated air is passed through the fluidised bed. While this is happening, the heated gas on the one hand passes energy to the bulk material and becomes at least partially but under ideal conditions completely saturated with the vapour of the liquid. By introducing the gas directly into the mechanically created fluidised bed, it is possible at the outset to work with optimum velocities, because the creation of the fluidised bed does not depend upon the quantity or velocity of the gas flow. Furthermore, there is the added advantage that the gas velocity or gas quantity can be optimised to suit the drying process. For physical considerations, it is evident that for a given relative humidity of the gas used for drying, the quantity of vapour carried away will depend essentially only on the temperature of the gas or on its capacity for saturation and upon the supply of energy via the heat content of the gas. Thus are created ideal conditions whereby the temperature of the gas, the quantity of the gas, relative humidity of the gas prior to introduction into the drying process and so on can be finely attuned to one another.

The heat potential of the material can emanate from preceding heating of the material and/or from a heating of the material by reason of its being thoroughly mixed in the mixing apparatus.

It is expedient for the fluidised bed to circulate with a vertical and a tangential component.

A further development of the method according to the invention provides for the gas for drying to be passed in a closed circuit, to be heated in a heat exchanger before being introduced into the drying process and, after it has been at least partly saturated with vapour, from the moisture in the bulk goods, fed to a washing process for direct condensation.

Within the framework of a further development of the method according to the invention, it is a good idea to use for the washing process the same liquid as that which is contained in the material.

Furthermore, it is expedient during the washing process or the direct condensation process to cool the circulating gas with liquid at a lower temperature and to free it from vapour until it becomes saturated, according to the new temperature level.

The closed circuit for the gas has inter alia the decided advantage that emissions to the environment can be avoided and that furthermore only partial cleansing of the gas to remove the vapour is required.

Within a further development of the method according to the invention, it is suggested that the liquid used as a washing fluid be cooled in its own circuit to the temperature needed for condensation of the vapour. In this respect, it is possible by using so-called refrigerating assemblies, to reduce the temperature of the liquid as desired, down to just short of its setting point. Thus it is possible to enjoy optimum control of the temperature of the gas flow and the condensing of the vapour contained therein.

It is also a good idea to introduce additional outside energy into the circuit of the gas flow prior to its entering the fluidised bed, when the supply of heat from the energy potential of the gas flow from the fluidised bed is inadequate. According to a further development, it is intended that the additional energy needed for evaporation should be incorporated as friction heat by controlling the speed of revolution of the fluidised bed. This might be achieved for instance by regulating the rotary speed as a function of the energy required. This entails the considerable advantage that the necessay heat energy can be introduced directly into the wet material. Thus, localised overheating of material or degrees of efficiency which impair the transfer of heat can be avoided. This leads to a regular withdrawal of liquid from all particles of the material.

A further development of the method according to the invention resides in the fact that the energy required for heating can be largely withdrawn from the energy potential of the gas flow from the fluidised bed by cooling and by condensation of the vapour and can be returned to the cooled gas flow by a heat pump. As already mentioned above, the vaporisation process is tied to the existence of latent heat energy or to the supply of energy. For this purpose, prior to being introduced into the fluidised bed, it is expedient for the gas flow to be heated. As the gas is freed from the liquid vapour, energy is extracted. This energy could for instance without influencing the environment be discharged into the surroundings and indirect heat exchange being provided for by means of a heat exchanger. Instead of this, it is according to the invention suggested that the energy to be delivered to the environment be returned by a heat pump to the gas flow after its discharging process within the framework of direct condensation and prior to its entry into the fluidised bed. In this way, considerable energy is obtained and an additional burden on the environment is avoided.

According to a further development of the method, the gas which is passed in the circuit is an inert gas, e.g. nitrogen, carbon dioxide or the like. This has the additional advantage that for example dangers which might emanate from drying of solvent-containing bulk material, e.g. the risks of explosion, can be excluded.

Expediently, the inert gas is only added in such quantities that the explosion limit is not attained. Ideally, a so-called oxygen analyser monitors the maximum admissible oxygen content and, as required, further inert gas can be introduced. And so the advantages of the combined application of vacuum drying, aeration drying and the use of inert gas within the framework of aeration drying, are all utilised. When using inert gas, the risks of explosion are substantially reduced so that it is possible to dispense with complicated protective measures.

For the method according to the invention, it is favourable on economic grounds and for reasons associated with process times, to recognise the moment of direct switch-over from sub-atmospheric pressure to aeration drying. This switch-over point can be established for known recipes, e.g. simply as a function of the time. It is however substantially more sensible to determine the temperature pattern of the bulk material so that as soon as the process runs out of the optimum temperature range, it is possible to switch over to aeration drying. Since the measurement of temperature is always tied up with the problem of heat transfer to the temperature sensor, it is a good idea continuously to measure the absolute pressure inside the mixing container.

From knowledge of the absolute pressure, the associated equilibrium temperature of the vapour-gas mixture can be calculated and the switch-over performed.

Furthermore, instead of the absolute pressure measurement, it is advantageous to establish the increase in incidence of condensate in the condensate collecting tank in relation to time. As soon as the formation of condensate approximates an asymptode in a given period of time, the time has come to depart from sub-atmospheric pressure drying and to change over to aeration drying. This time-related pattern of condensate formation can be ascertained in a computer and automatic switch-over is then feasible.

It is furthermore advantageous for both the vacuum-vapour flow from the fluidised bed and also the vapour-laden stream of gas to be passed through the same filter unit.

A further advantageous development of the method envisages the flow of gas being passed through the fluidised bed at a pressure which is below atmospheric pressure. This has the advantage that drying can be carried out at a lower level of temperature while making use of earlier boiling of the liquid.

Furthermore, it is expedient for the gas flow to be passed through the fluidised bed at an above-atmospheric pressure. This accelerates the drying process since the gas which is subjected to a higher pressure can absorb a greater quantity of vapour and so the number of circuits which the gas completes through the system will be considerably reduced.

Figure 2:
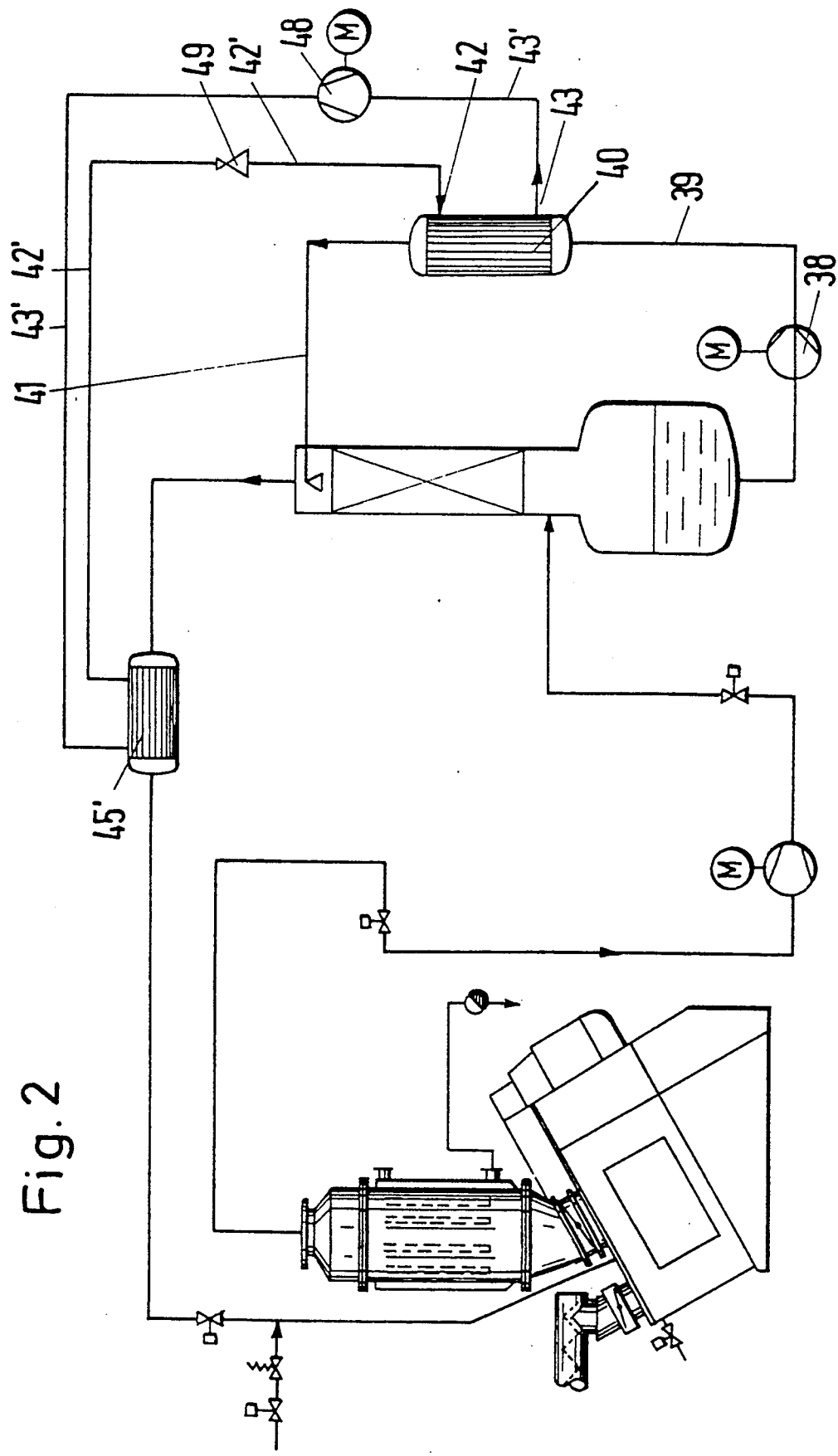
Figure 3:
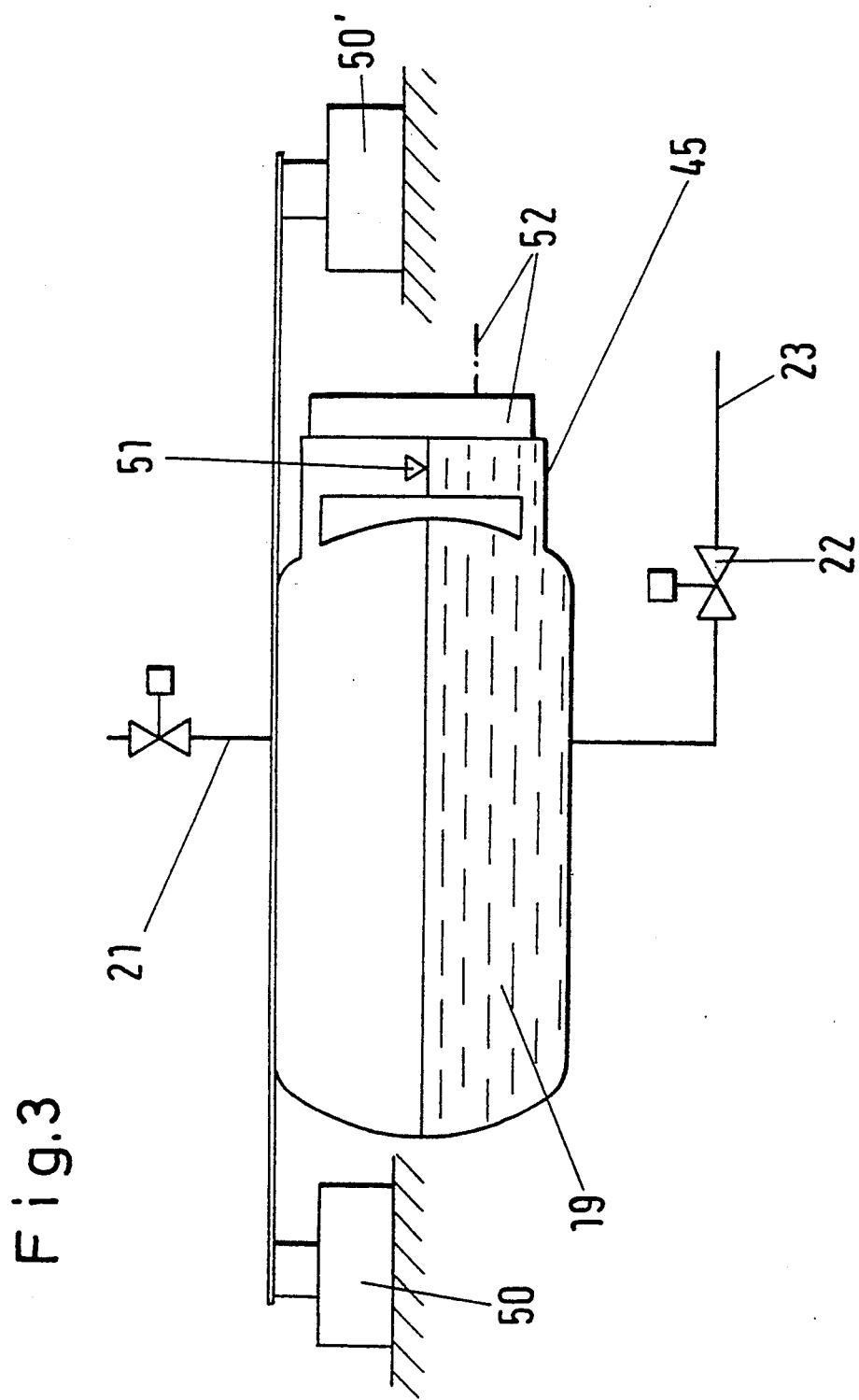
Figure 4:
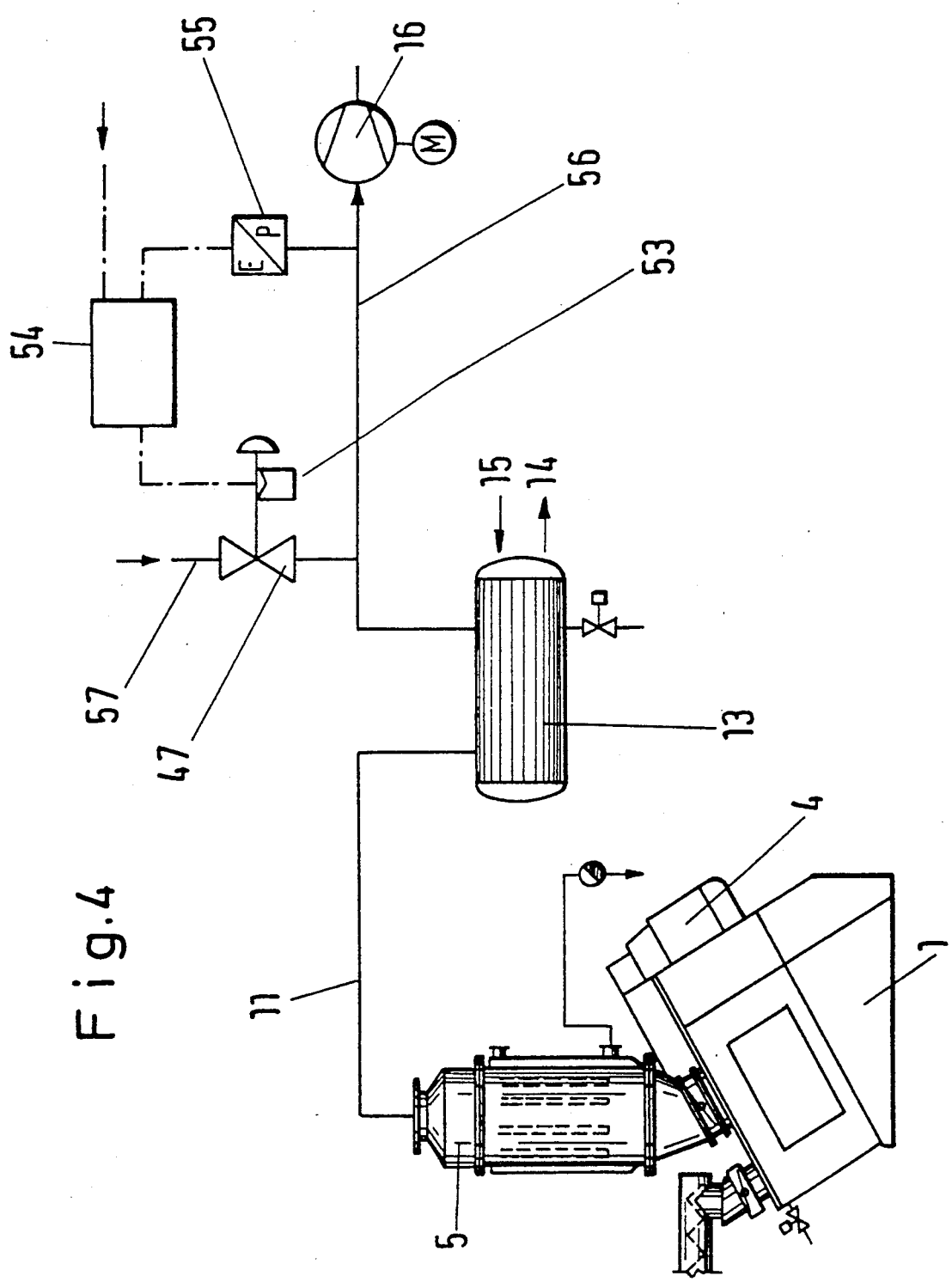
Figure 5:
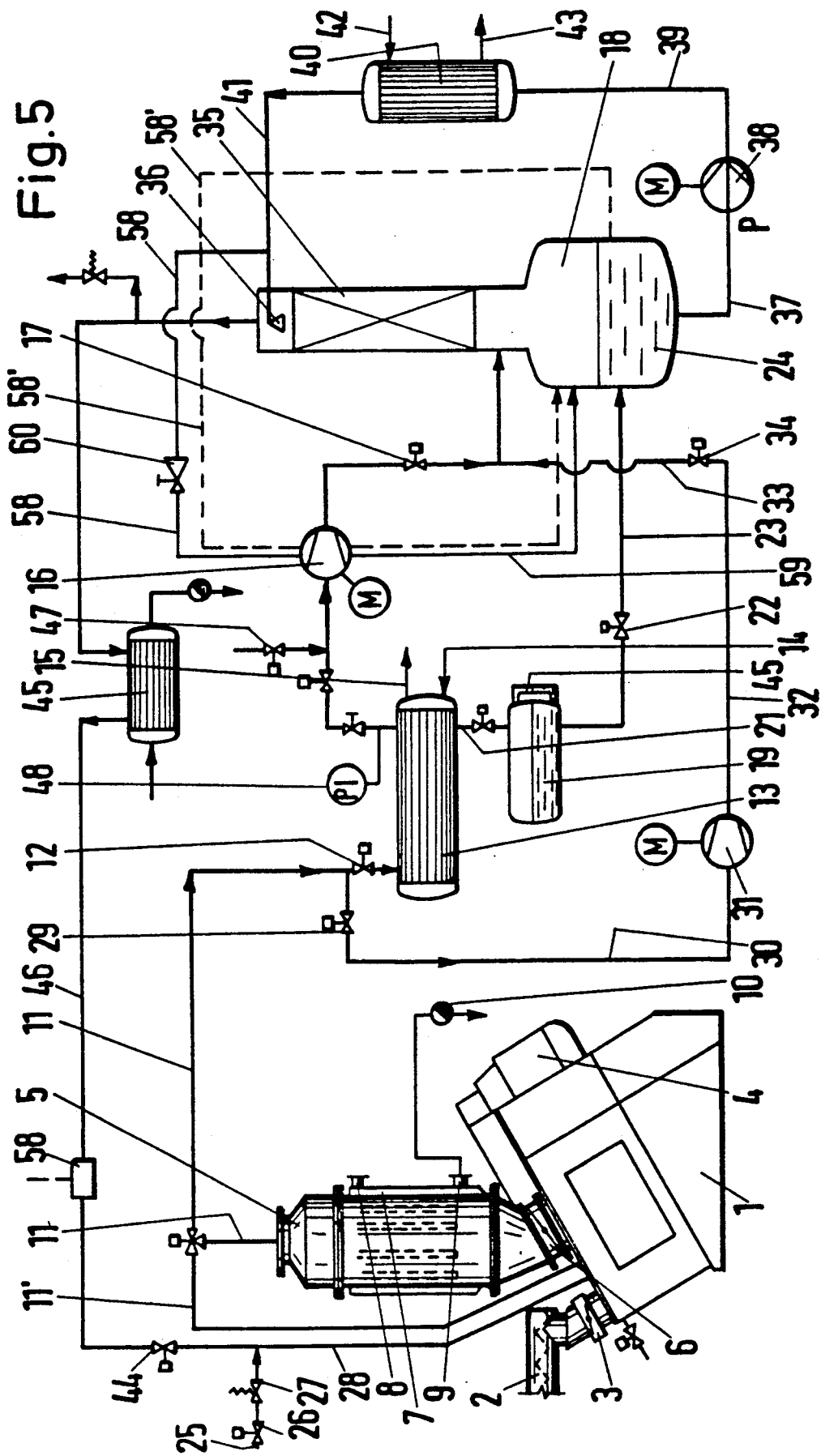

In the accompanying drawings:

FIG. 1 is a flow diagram of an embodiment of the method according to the invention, FIG. 2 shows the part of the aeration drying plant coupled by a heat pump, FIG. 3 diagrammatically shows the condensate collecting tank with means of measuring the quantity of condensate, FIG. 4 diagrammatically shows the build up of a control circuit for maintaining constant the pressure with the treatment chamber and FIG. 5 is a flow diagram of another embodiment of method according to the invention.

In FIG. 1, the vacuum-resistant mixer 1 required to carry out the method has a product feed 2 with a valve 3 which can be closed. The fluidised bed is created by a driving motor 4 via a mixing tool, not shown. Mounted at the top end of the mixer is an exhaust filter 5. Between the exhaust filter and the mixing chamber is a valve 6.

The housing of the exhaust filter is provided with a double jacket 7 so that a heating medium can be passed through the connector 8 and the discharge of heating medium through the connector 9 or in the case of steam heating, a condensation drain 10. In the case of vacuum operation, the interior of the mixer is connected via the pipe 11, 11' to the valve 12 with a condenser 13. Cooling medium flows through the condenser via the feed and return 14 and 15. The vacuum pump 16 is connected to the vapour or condensate-carrying interior of the condenser. The exhaust side of the vacuum pump is connected to the condensation column 18.

In conjunction with the pressure measuring device 48 and a regulator not shown here, the valve 47 serves to control the vacuum during vacuum operation or to relieve the system of vacuum and restore it to atmospheric pressure.

The condensate precipitated in the condenser passes into the condensate collecting tank 19. The valves 21, 22 provide for barometric separation between the condensation column 18 and the condenser 14 which is at a vacuum. The condensate from the condensation collecting tank 19 is passed through the pipe 23 to the collecting chamber 24 of the condensation column 18.

The supply of gas for aeration drying takes place through the pipe 25, the valve 26 and the pressure reducing valve 27 into the gas pipe 28. In the case of aeration drying, the valves 12 and 17 are closed. The gas charged with exhaust fumes passes through the exhaust filter 5, the pipes 11 and 30 by means of the blower 31 through the pipes 32 and 33 and passes into the condensation column 18. In this case, the valves 29 and 34 are open. If operation is with barrier gas, an oxygen analyser 58 monitors the maximum admissible oxygen content of the barrier gas.

The condensation column 18 consists of the condensation collecting chamber 24, the actual body 35 of the column and a liquid distributor device 36 which is not shown in greater detail.

During operation, liquid from the collecting chamber 24 of the condensation column 18 is passed through the pipes 37, 39, 41 through the heat exchanger 40 to the distributor device 36 by the pump 38. The heat exchanger 40 is equipped with feed and return 42 and 43 for a cooling medium.

In FIG. 2, the part of the aeration drying plant is shown which has a heat link via a heat pump between the heat exchanger 40 (cooling of the condensate) and the heat exchanger 45 (heating of the circuit gas). The heat pump is shown here symbolically by the two elements: compressor 48 and evaporator 49. The two heat exchangers 45 and 40 are connected by the heat pump to the piping system 42' and 43'.

Fig. 3 shows the condensate collecting tank 19 with measuring means for determining the quantity of condensate. The condensate feed takes place through the pipe 21 while the condensate is drained off through the pipe 23.

45 represents the level measuring device. Here, it is shown as a float device. According to the contents of the condensate collecting tank, so that float 51 assumes a corresponding height. This height is ascertained by a measured value transmitter 52 and transmitted to a computer not shown here. For relatively high accuracies of measurement, the condensate collecting tank 19 should be suspended in such a way that it can be weighed. In this case, the pipes 21 and 23 are so laid that they cannot influence the result of the measurement.

The two measuring cells 50 and 50' constantly ascertain the weight of the container with its contents and feed the results to the computer which is not shown here.

FIG. 4 diagrammatically shows the construction of a control circuit for maintaining constant the pressure inside the treatment chamber. In the pipeline 56 between vacuum pump 16 and condenser 13 there is a control valve 47 with a positioning controller 53 and a measuring transducer 55 for measuring the absolute pressure. The measuring transducer 55 and the control valve 57 or its positioning controller 53 are electrically connected to the controller 54, the desired value being fed in either by hand or emanating from a computer, not shown here.

As the method is carried out in accordance with the invention, the valve 3 at the product supply is closed. The valve 6 between exhaust filter mixer is opened while the valves 44, 34 and 29 are closed. After the vacuum pump 16 has been set in motion, the exhaust fumes pass through the exhaust filter 5 via the pipe 11 into the condenser 13 where they are condensed out. The condensate passes into the condensate collecting tank 19. This condensate collecting tank 19 has a level gauge 45 with means not shown here but adapted for remote measured value transmission. The level gauge can be used for measuring the amount of condensate which is dependent upon the time elapsed and transmitted to the computer which is not shown here.

This takes place for example by means of a device mounted at the end and having a float 51 and the associated measured value sensor 52 or alternatively, if the condensate tank 19 is suspended in such a way that it can be weighed, then with the two measuring cells 50 and 50'.

In order to keep to a specific temperature profile, an absolute pressure is imposed on the system. This absolute pressure emerges from determination of the equilibrium between the temperature and the vapour pressure of the liquid concerned. This is carried out by a controller 54 which compares the desired value from the computer with the pressure content of the system. For sensing the pressure, so-called absolute pressure sensor 55 is provided and has an associated measuring transducer. If the desired and actual values diverge from each other, then the controller 54 imparts suitable pulses to the positioning controller 53 on the control valve 47 so controlling the secondary air or supply of gas through the pipe connection 57.

Upon completion of the vacuum drying stage, the condensate collecting tank 19 is emptied into the condensate collecting tank 24 of the condensation column 18. After completed switch-over to aeration drying, the valves 12 and 17 are closed and valves 29 and 34 are opened.

The interior of the mixer container which is subject to a vacuum is filled with gas or rendered inert with barrier gas through the pipe 25, the valve 26, the pressure reducing valve 27 and the pipe 28. As during vacuum operation, the double jacket 7 of the exhaust filter 5 has a heating medium passed through it in order to avoid the exhaust fumes condensing out on the wall of the filter housing. The gas heated in the heat exchanger 45a passes through the pipe 46 into the interior of the mixing container where it is introduced into the rotatingly circulating fluidised bed, when it loses temperature on the one hand and becomes charged with vapour on the other. The gas or the barrier gas is passed in a circuit by the blower 31 through the condensation column 18, the heat exchanger 45 and the mixer. The steam saturated or partially saturated gas passes through the pipe 11, 30, 32 into the condensation column 18. From here, it flows through the column 35 which is packed for instance with a filling material. In the column 35, the gas is cooled in counter current by solvent cooled in the heat exchanger 40 and passed in a circuit by the pump 38, and a vapour fraction is washed out. By the so-called direct condensation in the column 35, very high heat transfer indices are achieved for cooling of the gas flow and above all the formation of the mist during the cooling process is avoided. In the further circuit, the gas which has been cooled and which is largely cleansed of liquid vapours is fed back to the heat exchanger 45a where it is heated, dried and returned to the circulating fluidised bed.

Before the barrier gas enters the fluidised bed, the oxygen content of the gas is ascertained by the oxygen analyser 58, for example in the pipe 46. If necessary, further feeding of barrier gas takes place with the help of a control circuit, not shown here.

A heat pump, illustrated with the two elements: compressor 48 and evaporator 49, transports the heat energy extracted in the heat exchanger 40 to the heat exchanger 45a, where the gas or barrier gas is heated again.

The alternative shown in FIG. 5 differs from the embodiment shown in FIG. 1 in that the pump 16, which is ideally a liquid ring vacuum pump, is operated with liquid from the collecting chamber 24 of the condensation column 18, the liquid then being fed back into the collecting chamber 24. This avoids contaminated operating fluid from the pump passing into the environment.

In accordance with the alternative embodiment shown by solid lines in FIG. 5, a partial flow of the liquid emerging from the collecting chamber 24 via the heat exchanger 40 through the pipe 58 with the valve 60 is fed to the pump 16 as operating fluid, whence it is fed back through the pipe 59 into the collecting chamber 24.

According to the alternative embodiment shown by broken lines in FIG. 5, liquid from the collecting chamber 24 is fed directly through the pipe 58' to the pump 16, from which it passes back again to the collecting chanber 24.

I claim:

1. A method of extracting liquid from a fluidised bed of wet material having a heat potential, comprising the steps of circulating a fluidised bed of said material created mechanically by mixing means, said fluidised bed circulating with a vertical and tangential component, the material being substantially thoroughly mixed; in a first stage utilizing the heat potential of the wet material to at least partially evaporate the liquid contained at below atmospheric pressure, and in a second stage immediately following the first stage, passing heated gas through the fluidised bed, the extraction process being completed by at least partial saturation of the gas with vapour from the liquid which is to be extracted.

2. A method according to claim 1 wherein the gas used in the second stage of the method for drying purposes is passed in a closed circuit, heated in a heat exchanger and after at least partially saturated with the vapour from the liquid to be extracted fed to a washing process.

3. A method according to claim 2 wherein said washing process is performed with a washing fluid which is the same liquid contained in and intended to be extracted from the material.

4. A method according to claim 3, wherein during the washing process, the gas is cooled with a lower temperature liquid and is freed from the absorbed vapour until it reaches a stage of saturation according to a new temperature level.

5. A method according to claim 4, characterised in that the liquid used as a washing fluid is cooled in its own circuit to the temperature required to condense the vapour.

6. A method according to claim 5 wherein the energy required for heating the gas is at least partially drawn from the energy potential of the gas stream from the fluidised bed by cooling and by condensation of the vapour, and is fed back to the cooled stream of gas by means of a heat pump.

7. A method according to claim 6, characterised in that additional external energy is introduced into the circuit of the gas flow prior to its entering the fluidised bed, provided that the heat energy from the energy potential of the gas flow from the fluidised bed is not sufficient.

8. A method according to claim 7, characterised in that the additional energy needed for evaporation is introduced as frictional heat by controlling the speed of rotation of the fluidised bed.

9. A method according to claim 8 wherein an inert gas is used as the gas in the second stage of the method.

10. A method according to claim 9, characterised in that the inert gas is only added in such quantities that the explosion limit is not reached.

11. A method according to claim 10 including the step of monitoring the maximum admissible oxygen content and initiating the process of topping up with inert gas as required.

12. A method according to claim 11 wherein the temperature envisaged for switch-over from the first to the second stages in the method is ascertained by absolute pressure measurement and calculation of the equilibrium temperature of the vapour-gas mixture.

13. A method according to claim 12 wherein the quantity of condensate occurring in a condensate collecting tank is ascertained in terms of weight or volume and used as a measure for switch-over from the first to the second stage in the method.

14. A method according to claim 13 wherein both the vacuum-vapour flow from the fluidised bed and also the vapour-laden gas flow are passed through the same filter unit.

15. A method according to claim 14 wherein the second stage of the method the gas flow is passed through the fluidised bed at a pressure which is below atomospheric pressure.

16. A method according to claim 14 wherein in the second stage of the method, the flow of gas is passed through the fluidised bed at a pressure which is higher than atomspheric pressure.

17. A method according to claim 16 wherein the first stage of the method includes utilizing the same liquid as that contained in and which is to be extracted from the wet material as operating fluid for the vacuum pump for generating sub-atmospheric pressure.

18. A method according to claim 17 wherein the operating fluid of the vacuum pump is drawn from the condensate of the vapour entrained by the gas flow from the fluidised bed whereupon it is combined again with this condensate.

* * * * *